United States Patent [19]

Perkins

[11] 4,390,037

[45] Jun. 28, 1983

[54] GAS REGULATION DEVICE FOR GAS ACTUATED VALVES

[75] Inventor: Lawrence B. Perkins, Woodward, Okla.

[73] Assignee: W. T. Fail, Inc., Shawnee, Okla.; a part interest

[21] Appl. No.: 371,242

[22] Filed: Apr. 23, 1982

Related U.S. Application Data

[63] Continuation of Ser. No. 103,843, Dec. 14, 1979, abandoned.

[51] Int. Cl.³ .......................... B08B 9/02; F16K 31/18
[52] U.S. Cl. .................................... 137/240; 55/169;
55/219; 91/443; 134/166 C; 137/59; 137/166;
137/415; 138/44; 237/80; 251/47; 251/36
[58] Field of Search ...................... 55/169, 219; 91/29,
91/443, 463; 137/166, 195, 202, 59, 240, 414,
415, 624.11; 134/166 C; 138/31, 44; 237/80;
251/120, 36, 47

[56] References Cited

U.S. PATENT DOCUMENTS

| 482,564 | 9/1892 | Schilling | 137/415 |
|---|---|---|---|
| 1,148,193 | 7/1915 | Ross et al. | 251/120 |
| 1,460,746 | 7/1923 | Carlstedt | 137/415 |
| 1,988,769 | 1/1935 | Aldridge et al. | 137/59 |
| 2,056,420 | 10/1936 | Colby | 137/414 |
| 2,064,962 | 12/1936 | Waters | 137/415 |
| 2,574,823 | 11/1951 | Fulkerson | 137/415 |
| 2,995,201 | 8/1961 | Stafford et al. | 137/202 |
| 3,228,301 | 1/1966 | Bolie | 91/443 |
| 3,279,484 | 10/1966 | Brinkel | 91/29 |
| 3,376,977 | 4/1968 | Gordon et al. | 55/169 |
| 3,477,456 | 11/1969 | Powell | 137/415 |
| 3,744,511 | 7/1973 | AuWerter | 137/415 |
| 4,147,179 | 4/1979 | Miura | 91/443 |

Primary Examiner—George L. Walton
Attorney, Agent, or Firm—Christopher H. Morgan

[57] ABSTRACT

A gas regulation device to delay for a predetermined time the closing of a gas actuated main valve of the type having a main valve conduit connected to the main valve for carrying the gas which actuates the main valve. The regulation device comprises a first conduit which can be disposed in the main valve conduit to form a portion thereof and a check valve which is disposed in the first conduit so that gas can pass through the first conduit only in one direction. A bypass conduit is connected to the first conduit across the check valve such that gas can pass from the first conduit on one side of the check valve through the bypass conduit to the first conduit on the other side of the check valve. A flow regulation device is disposed in the bypass conduit to limit the flow of gas through said bypass conduit such that the pressure drop or increase required to open or close the main valve is delayed for a predetermined time.

3 Claims, 3 Drawing Figures

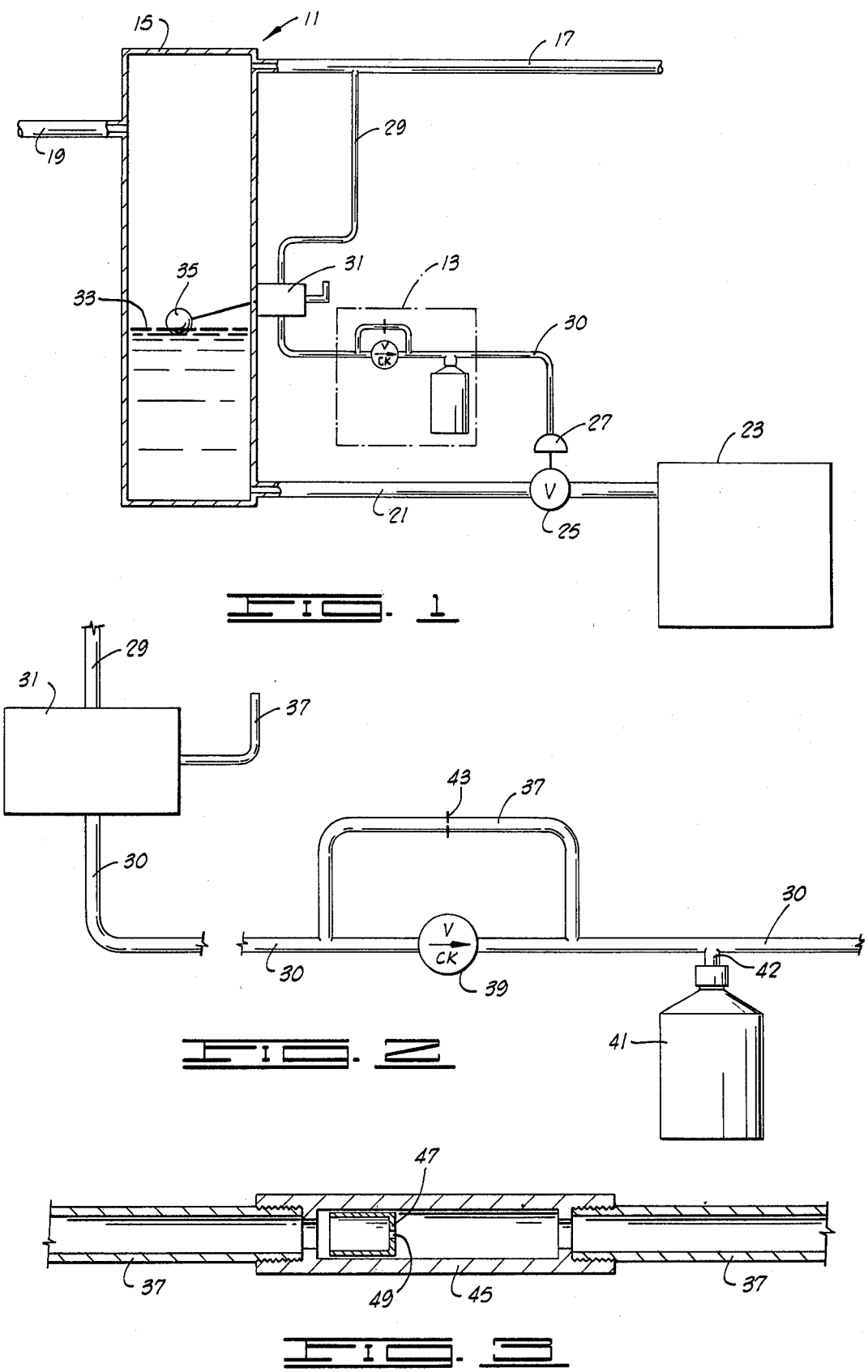

GAS REGULATION DEVICE FOR GAS ACTUATED VALVES

This is a continuation of application Ser. No. 103,843, filed Dec. 14, 1979, entitled Gas Regulation Device for Gas Actuated Valves (now abandoned).

BACKGROUND OF THE INVENTION

1. Field of the Invention

This invention relates in general to gas actuated valves and more particularly to the methods and devices to regulate the opening and closing of these gas actuated valves on gas well separators.

2. Background of the Invention

In the past, it has often been found useful to activate the opening and closing of valves by pressurized gas. For example, in gas well operations a source of pressurized gas is readily available to provide the power for automatic operation of devices in the area, including the operation of valves. Other suitable power sources are usually not conveniently available. In this gas well environment a particular valve which is usually gas actuated is the valve which regulates the flow of liquid from a liquid separator to a liquid holding tank. This liquid separator functions to remove water and hydrocarbon liquids from the gas before the gas is pumped away from the well. When the liquid level in the separator reaches a predetermined height, a float valve directs pressurized gas to a gas actuated valve on a dump line conduit which connects the bottom of the separator tank to a holding tank. The pressurized gas opens the valve and the pressure above the liquid in the separator causes the liquid to flow through the dump line into the holding tank until the liquid level in the separator falls to a second predetermined height. At this height the float valve causes the pressurized gas to be vented and when the pressure falls sufficiently the gas actuated valve closes. This ends the dump cycle and the liquid level in the separator again rises. Usually the dump line is buried to provide additional insulation and the lines above the ground are covered with insulation. Yet, even with these precautions, the dump line will occasionally freeze. This requires the dump line to be dug up and thawed during the cold months when the ground is frozen. Of course, digging under these conditions is extremely unpleasant and expensive.

One of the main reasons the liquid in the dump line freezes is that the operation of the gas actuated dump line valve is cyclical, causing liquid to be stagnant in the dump line for significant periods. However, it is not practical to provide a steady flow through the dump line and even if such steady flow were provided the line could still freeze.

SUMMARY OF THE INVENTION

It is accordingly an object of the present invention to provide a gas regulation device which operates to delay the closing of a gas actuated valve.

It is also an object of the present invention to provide such a gas regulation device which can operate in connection with a gas well separator to improve the separator such that freezing of the dump line will not occur during the cold months.

A further object of this invention is to provide a gas regulation device which can easily be attached to a gas well separator and which is adjustable to delay the closing of the gas actuated valve for a proper interval such that the dump line will be cleared of liquid during each dump cycle.

The gas regulation device of the present invention operates to delay the closing of a gas actuated main valve of the type having a main valve conduit connected to the main valve for carrying the gas which actuates the main valve. This device comprises a check valve disposed in a first conduit which can be disposed in the main valve conduit to form a portion thereof. The check valve allows the gas to pass through the first conduit only in one direction. A bypass conduit connected to said first conduit across said check valve allows gas to pass from the first conduit along one side of the check valve through the bypass conduit to the first conduit on the other side of the check valve. A means for restricting the flow of gas through said bypass conduit is provided to delay the pressure change in the gas at the main valve such that closing of the main valve is delayed.

Preferably the gas regulation device of the present invention is adjustable to allow the interval of delayed closing to be altered. This can be achieved by using a removable orifice plate to restrict the flow of gas in the bypass conduit. By changing the orifice size the delay interval is altered. This can also be achieved by adding a variable or removable gas container to the first conduit. This changes the volume of gas which must pass through the orifice in the process of closing the valve.

The above described device provides a method to prevent freezing of the dump line of a gas well separator by delaying the closing of the dump line valve until the dump line is cleared of liquid.

For a further understanding of the invention and further objects, features and advantages thereof, reference may now be had to the following description taken in conjunction with the accompanying drawings.

BRIEF DESCRIPTION OF THE DRAWINGS

FIG. 1 is a schematic view of the present invention shown attached to a gas well separator depicted schematically in a cross-sectional view.

FIG. 2 is an enlarged schematic view of the regulation device shown in FIG. 1.

FIG. 3 is a cross-sectional view of a bypass conduit and orifice which can be used as part of the present invention.

DESCRIPTION OF THE PREFERRED EMBODIMENTS

Referring now to FIG. 1, the gas regulation device 13 of the present invention is shown schematically attached to a gas well separator 11. The separator 11 comprises a separator tank 15 which receives gas and liquid from a gas well through gas line or pipe 19. As the gas and liquid pass through separator tank 15, the liquid drops out and the dry gas passes out of tank 15 through a dry gas line 17. The liquid from separator tank 15 passes through a dump line 21 into a holding tank 23. The flow through dump line 21 is regulated by a dump line valve 25 disposed on the dump line. Although FIG. 1 shows the dump line valve 25 located mid-way along dump line 21, in actuality the dump line valve is located adjacent to the separator tank 15. The portion of dump line 21 between valve 25 and holding tank 23 is usually buried in the ground for insulation and is relatively much longer than the portion of the line between separator tank 15 and dump line valve 25.

As described above, the dump line valve 25 is normally gas actuated by a gas actuated opening mechanism 27. Such opening mechanisms are well known in the art. Gas from line 17 passes through a pressurized gas control line into a float valve 31 which conveys the pressurized gas to the opening mechanism 27 on dump line valve 25. Float valve 31 has attached to it a float 35 so that float valve 31 is responsive to the liquid level 33 in separator tank 15.

Without the attachment of gas regulation device 13 of the present invention, the gas well separator 11 operates to cyclically remove the liquid from separator tank 15 to the holding tank 23. As gas and liquid enter separator tank 15 through gas well line 19 the liquid drops out and the liquid level 33 in separator tank 15 rises. When the liquid level 33 reaches a first predetermined height, float 35 causes float valve 31 to open communicating the gas line 29 to the gas line 30. This causes pressurized gas to enter the gas opening mechanism 27 on dump line valve 25. When the pressure of the gas in opening mechanism 27 rises sufficiently, dump line valve 25 is caused to spring open and liquid passes through dump line 21 into holding tank 23. The liquid in separator tank 15 is urged through dump line 21 into holding tank 23 by the pressure to the gas in separator tank 15 above the liquid. This gas pressure in separator tank 15 is maintained by the pressure of the gas in the well.

After the dump line valve 25 has been opened, the liquid level 33 in separator tank 15 begins to fall. When liquid level 33 reaches a second predetermined level which is lower than the first predetermined level, float 35 causes float valve 31 to isolate gas lines 29 and 30 and to vent the gas from line 30 such that the gas pressure on opening mechanism is released. Dump valve 25 then springs closed halting the flow of liquid through dump line 21. The liquid level 33 in separator tank 15 then rises again until the first predetermined level is attained and float valve 31 opens.

Referring now to FIG. 2, the invention 13 and float valve 31 are shown enlarged. Since this is merely a schematic view the invention is shown as an integral portion of conduit 30. However, normally the invention would comprise a separable unit which could be attached to conduit 30 to form a portion thereof. This attachment could be by a threaded connection on either end of the gas regulation device or by other conventional connecting means.

The gas regulation device of the present invention comprises a conduit attached to form a portion of gas line 30. This conduit portion contains a check valve 39 which allows gas to pass only in the direction from float valve 31 toward opening mechanism 27. A bypass conduit 37 is attached to conduit 30 on one side of check valve 39 to conduit 30 on the other side of check valve 39. A gas container 41 is attached to conduit 30 by a threaded connection 42 upstream of the check valve 39 when check valve 39 is allowing gas to pass therethrough. An orifice plate 43 is positioned in bypass line 37 to restrict the flow of gas through bypass line 37.

The gas regulation device shown in FIG. 2 operates to delay the closing of dump line valve 25. This delay is achieved by slowing the gas venting operation of float valve 31. The regulation device does not, however, delay the opening of dump line valve 25.

Referring now to FIGS. 1 and 2, the operation of the present invention will be described. When liquid level 33 in separator tank 15 reaches the first predetermined level such that float valve 31 opens and communicates gas line 29 and gas line 30, gas passes through line 30 to opening mechanism 27. This flow is not inhibited since check valve 27 opens to allow flow in this direction. As a result of the increased gas pressure, opening mechanism 27 opens dump line valve 25. As the liquid level 33 falls, float 35 causes float valve 31 to close off gas line 29 and to vent gas line 30 through vent 37. Gas pressure on opening mechanism 27, however, is not immediately released because check valve 39 closes preventing the normal venting of gas. Because check valve 39 is closed, gas from opening mechanism 27 must be vented through bypass line 37 and this gas flow is restricted by orifice plate 43. By selective sizing of the orifice in orifice plate 43, the time period required for venting the gas from opening mechanism 27 through vent 37 can be regulated such that the liquid in separator tank 15 and dump line 21 is completely exhausted prior to the closing of dump line valve 25. Thus, the closing of dump line valve 25 is delayed until the dump line 21 is cleared of liquid. The gas pressure of the well and in separator tank 15 insures that the dump line is completely cleared. Since there is no liquid remaining in dump line 21, the dump line cannot freeze in cold weather.

The period required for closing of dump line valve 25 can be varied by changing the orifice size in orifice plate 43 or by varying the size of gas container 41. Gas container 41 is filled with pressurized gas when gas enters opening mechanism 27. This pressurized gas in container 41 must be vented along with the gas in line 30 between check valve 39 and mechanism 27 before the opening mechanism 27 will allow valve 25 to close. Since the volume of gas which must pass through the orifice in orifice plate 43 is dependent upon the volume of container 41, this volume determines the time period required to vent the pressurized gas and close dump line valve 25.

Container 41 is threadedly connected to conduit 30 such that the container can be easily removed and selected container volume and delay times achieved.

Referring now to FIG. 3, an alternate embodiment of bypass line 37 is shown. In this embodiment orifice plate 43 is replaced with a piston 47. This piston travels in a cylindrical housing 45 which forms a portion of bypass conduit 37. When pressure changes occur, the piston 43 moves to dampen the severity of that pressure change. This reduces the shock to equipment attached to line 30. Housing 45 can be threadedly connected to bypass 37 in order to allow this housing to be easily removed. It also allows the size of orifice 49 in piston 47 to be varied by replacement of the housing with a housing containing a different sized orifice.

The separator was shown operating such that gas pressure opens the dump line valve. It could, however, operate such that gas pressure closes the dump line valve. This would require that the gas regulation device of the present invention be reversed on the gas line 30.

Thus, the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art, which changes are encompassed in the spirit of this invention as defined by the appended claims.

The foregoing disclosure and showings made in the drawings are merely illustrative of the principles of this invention and are not to be interpreted in a limiting sense.

What is claimed is:

1. A gas and liquid separator comprising:
   a separator tank for receiving and holding separated liquid and pressurized gas from a gas and liquid source;
   a dump line conduit connecting said separator tank to a liquid reservoir for conveying accumulated liquid from said separator tank to said liquid reservoir;
   a gas actuated dump line valve for regulating the flow of liquid through said dump line conduit;
   a gas conduit and valve means connected to said dump line valve for actuating said dump line valve by supplying pressurized gas from a pressurized gas source to said dump line valve and relieving pressurized gas from said dump line valve responsive to the liquid level in said separator tank; and
   gas conveyance timing means for delaying closing of said dump line valve such that liquid in said dump line conduit is purged by pressurized gas from said separator tank after said dump line valve is opened responsive to said gas conduit and valve means and after the liquid from said separator tank has passed to said liquid reservoir and before said dump line valve is closed responsive to said gas conduit and valve means, said gas conveyance timing means comprising a gas flow limitation device connected to said gas conduit and valve means for limiting gas flow such that gas passes through said gas conduit and valve means for a predetermined time in the process of a gas conveyance which closes said dump line valve.

2. The gas and liquid separator of claim 1 wherein said gas conveyance timing means further comprises a varying means for varying the predetermined time for a gas conveyance process through said gas conduit and valve means which closes said dump line valve.

3. The gas and liquid separator of claim 1 wherein said gas conduit and valve means comprises a main gas conduit connecting a supply of pressurized gas to said dump line conduit and a float valve connected to said main gas conduit responsive to the liquid level in said separator tank; and wherein said gas limitation device comprises:
   a check valve disposed on said main gas conduit for allowing gas flow therethrough only in the direction of a gas conveyance through said gas conduit and valve means which opens said dump line valve conduit;
   a bypass connected to said main gas conduit for allowing as to flow to bypass said check valve; and
   a constriction means in said bypass conduit for limiting the flow of gas through said bypass conduit for a predetermined time in the process of a gas conveyance which closes said dump line valve.

* * * * *